United States Patent
Park et al.

(10) Patent No.: US 8,659,723 B2
(45) Date of Patent: Feb. 25, 2014

(54) LIQUID CRYSTAL DISPLAY MODULE

(75) Inventors: Jong Sin Park, Seoul (KR); Eung Do Kim, Gyeonggi-do (KR); Se Hong Park, Gyeonggi-do (KR); Kyung Ha Lee, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 492 days.

(21) Appl. No.: 12/941,495

(22) Filed: Nov. 8, 2010

(65) Prior Publication Data

US 2011/0128476 A1    Jun. 2, 2011

(30) Foreign Application Priority Data

Dec. 2, 2009  (KR) .................. 10-2009-0118456

(51) Int. Cl.
*G02F 1/1335*  (2006.01)
(52) U.S. Cl.
USPC .............................. 349/96; 349/106; 349/108
(58) Field of Classification Search
USPC ...................... 349/96–98, 106–109
See application file for complete search history.

(56) References Cited

U.S. PATENT DOCUMENTS

| | | | |
|---|---|---|---|
| 8,063,862 B2* | 11/2011 | Hisatake | 345/88 |
| 2005/0190323 A1* | 9/2005 | Iijima | 349/113 |
| 2006/0050209 A1* | 3/2006 | Higa | 349/114 |
| 2007/0076143 A1* | 4/2007 | Palk et al. | 349/96 |
| 2009/0059135 A1* | 3/2009 | Park et al. | 349/96 |

* cited by examiner

*Primary Examiner* — Bumsuk Won
*Assistant Examiner* — Charles Chang
(74) *Attorney, Agent, or Firm* — Morgan, Lewis & Bockius LLP

(57) ABSTRACT

A liquid crystal display module is disclosed, which facilitates to improve luminance of a liquid crystal panel by enhancing a light transmittance, the liquid crystal display module comprising a liquid crystal panel with plural unit pixels, wherein each unit pixel includes red(R), green(G), blue(B), and white (W) sub-pixels, for converting incident light into colored light; a light source for supplying light to the liquid crystal panel; a light-guiding plate for changing a horizontal direction of incident light from the light source into a vertical direction; and a polarizing plate including a polarization area for polarizing the light outgoing from the liquid crystal panel, and a hole for transmitting the light therethrough.

8 Claims, 4 Drawing Sheets

LIQUID CRYSTAL DISPLAY MODULE

CROSS REFERENCE TO RELATED APPLICATIONS

This application claims the benefit of the Korean Patent Application No. 10-2009-0118456 filed on Dec. 2, 2009, which is hereby incorporated by reference as if fully set forth herein.

BACKGROUND OF THE INVENTION

1. Field of the Invention

The present invention relates to a liquid crystal display module, and more particularly, to a liquid crystal display module capable of improving luminance of a liquid crystal panel by enhancing a light transmittance.

2. Discussion of the Related Art

An application field of liquid crystal display device (hereinafter, referred to as 'LCD device') has been gradually expanded owing to various advantages such as lightness in weight, thin profile, and low-driving power. In recent years, the LCD device is widely used for office automation devices, multimedia devices, and information communication devices.

A liquid crystal display module of the LCD device includes a liquid crystal panel which is provided with liquid crystal cells arranged in a matrix-type configuration between two glass substrates; and a backlight unit for supplying light to the liquid crystal panel.

The liquid crystal panel displays images by controlling a light transmittance according to a video signal applied to control switches such as thin film transistors (TFT) arranged in a matrix-type configuration. At this time, the liquid crystal panel cannot emit light in itself. Thus, the liquid crystal panel is supplied with the light emitted from the backlight unit including a light source, wherein the light source included in the backlight unit may be positioned at a rear side or lateral side of the liquid crystal panel. The backlight unit can be classified into a direct type and an edge type according to the position of the light source. In more detail, the direct type backlight unit includes the light source positioned at the rear side of the liquid crystal panel; and the edge type backlight unit includes the light source positioned at the lateral side of the liquid crystal panel.

FIGS. 1 and 2 illustrate a related art liquid crystal display module. FIG. 3 is a cross section view along A-A' of FIG. 2. FIGS. 1 and 2 show an edge-type backlight unit using a light-emitting diode (LED) as a light source.

Referring to FIGS. 1 to 3, the related art liquid crystal display module includes a liquid crystal panel 40 for displaying images by controlling a light transmittance of liquid crystal according to input video data; a light source 10 for supplying light to the liquid crystal panel 40; a lower polarizing plate 20 for polarizing the light emitted from the light source 10; a light-guiding plate 30 for guiding the light incident on its lateral side to a frontal direction of the liquid crystal panel 40; and an upper polarizing plate 50, positioned above the liquid crystal panel 40, for polarizing the light outgoing from the liquid crystal panel 40.

The liquid crystal panel 40 includes a lower glass substrate 41 on which control switches such as thin film transistors (TFT) are formed; an upper glass substrate 45 on which a color filter layer 44 is formed; a spacer (not shown) for maintaining a constant cell gap between the lower and upper glass substrates 41 and 45; a liquid crystal 42 filled in a space prepared by the spacer; and an over-coating layer 43 formed between the liquid crystal 42 and the color filter layer 44.

The liquid crystal panel 40 cannot emit the light in itself. Thus, the liquid crystal panel 40 displays the images by controlling the transmittance of light emitted from the light source 10. One of the most important points to be duly considered for improvement of the picture quality of the images displayed in the liquid crystal panel 40 is luminance of the light irradiated on the liquid crystal panel 40. That is, the light with high luminance has to be supplied to the liquid crystal panel 40, to thereby obtain the high picture quality in the displayed images.

In the related art liquid crystal display module having the aforementioned structure, the light emitted from the light source 10 comes out from the liquid crystal display module after traveling through the lower polarizing plate 20, the light-guiding plate 30, the liquid crystal panel 40, and the upper polarizing plate 50, whereby the luminance of light finally outgoing from the liquid crystal panel 40 is lowered considerably.

If the liquid crystal panel 40 has 13.3-inch (113 pixels per inch) size, the light transmittance of each of the lower and upper polarizing plates 20 and 50 is 45%; the light transmittance of each of the lower and upper glass substrates 41 and 45 is 94%; the light transmittance of TFT array and pixel on the lower glass substrate 41 of the liquid crystal panel 40 is 65%; and the light transmittance of color filter layer 44 of the liquid crystal panel 40 is 27%.

Eventually, the light outgoing from the liquid crystal panel 40 is only about 7~8% of the light emitted from the light source 10, whereby the light transmittance becomes low. Meanwhile, if the liquid crystal panel 40 has 32-inch (49 pixels per inch) size, the light outgoing from the liquid crystal panel 40 is about 5% of the light emitted from the light source 10, whereby the light transmittance becomes considerably lowered.

The related art liquid crystal display module is disadvantageous in that most of light emitted from the light source 10 is lost by passing through the lower polarizing plate 20, the upper polarizing plate 50, and the color filter layer 44, included in the liquid crystal panel 40, having the aforementioned light transmittances. Thus, the light efficiency of the related art liquid crystal display module is lowered by the light loss.

In order to overcome this problem, the plural light sources 10 may be additionally arranged in the backlight unit, to thereby improve the luminance of the liquid crystal display module. However, a manufacturing cost of the liquid crystal display module is increased due to the additionally-provided light sources 10. Also, if additionally driving the plural light sources 10, power consumption is highly increased.

SUMMARY OF THE INVENTION

Accordingly, the present invention is directed to a liquid crystal display module that substantially obviates one or more problems due to limitations and disadvantages of the related art.

An advantage of the present invention is to provide a liquid crystal display module which facilitates to improve light transmittance by enhancing transparency.

Another advantage of the present invention is to provide a liquid crystal display module which facilitates to improve luminance of liquid crystal panel.

Another advantage of the present invention is to provide a liquid crystal display module which facilitates to reduce a manufacturing cost.

A further advantage of the present invention is to provide a liquid crystal display module which facilitates to lower power consumption used for its driving mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display module comprising: a liquid crystal panel with plural unit pixels, wherein each unit pixel includes red(R), green(G), blue(B), and white(W) sub-pixels, for converting incident light into colored light; a light source for supplying light to the liquid crystal panel; a light-guiding plate for changing a horizontal direction of incident light from the light source into a vertical direction; and a polarizing plate including a polarization area for polarizing the light outgoing from the liquid crystal panel, and a hole for transmitting the light therethrough.

At this time, the hole of the polarizing plate is positioned in an area corresponding to at least one among the red(R), green (G), blue(B), and white(W) sub-pixels constituting the unit pixel.

In another aspect of the present invention, there is provided a liquid crystal display module comprising: a liquid crystal panel with plural unit pixels, wherein each unit pixel includes red(R), green(G), and blue(B) color filter layers, for converting incident light into colored light; a light source for supplying light to the liquid crystal panel; a light-guiding plate for changing a horizontal direction of incident light from the light source into a vertical direction; and a polarizing plate including a polarization area for polarizing the light outgoing from the liquid crystal panel, and a hole for transmitting the light therethrough.

At this time, each of the red(R), green(G), and blue(B) sub-pixels includes a hole to transmit the light therethrough.

Also, the hole of the polarizing plate is positioned in an area corresponding to the hole of the color filter layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a liquid crystal display module according to the present invention will be described with reference to the accompanying drawings.

Figure 1:
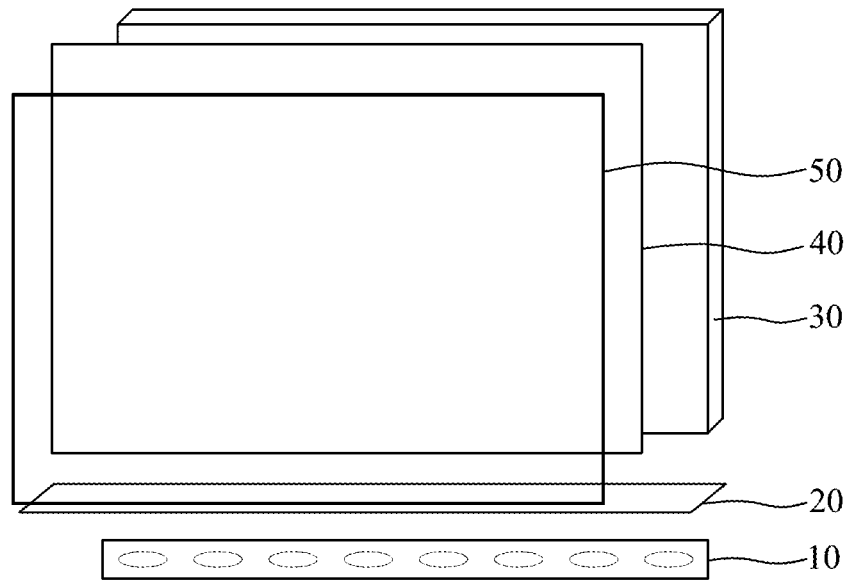
FIGS. 1 and 2 illustrate a related art liquid crystal display module.
Figure 2:
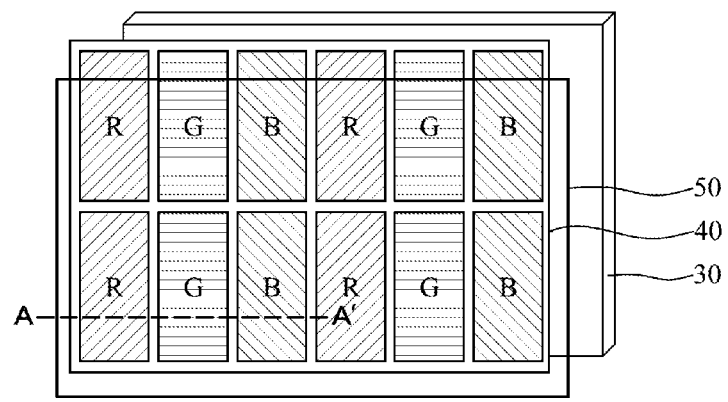
Figure 3:
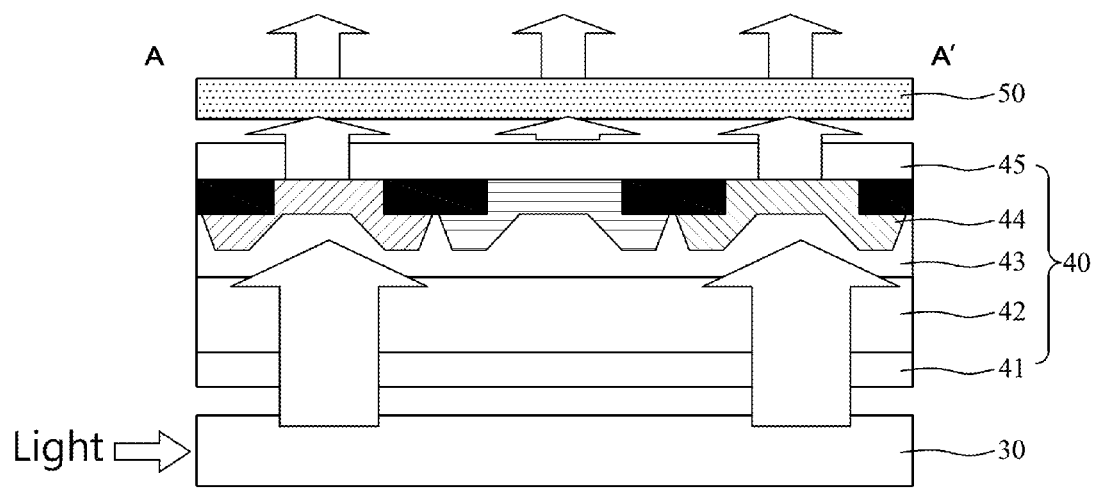
FIG. 3 is a cross section view along A-A' of FIG. 2.
Figure 4:
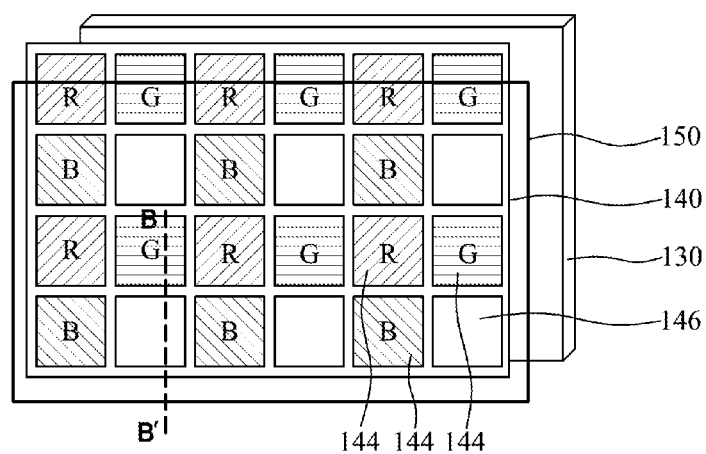
FIG. 4 illustrates a liquid crystal display module according to the first embodiment of the present invention.
Figure 5:
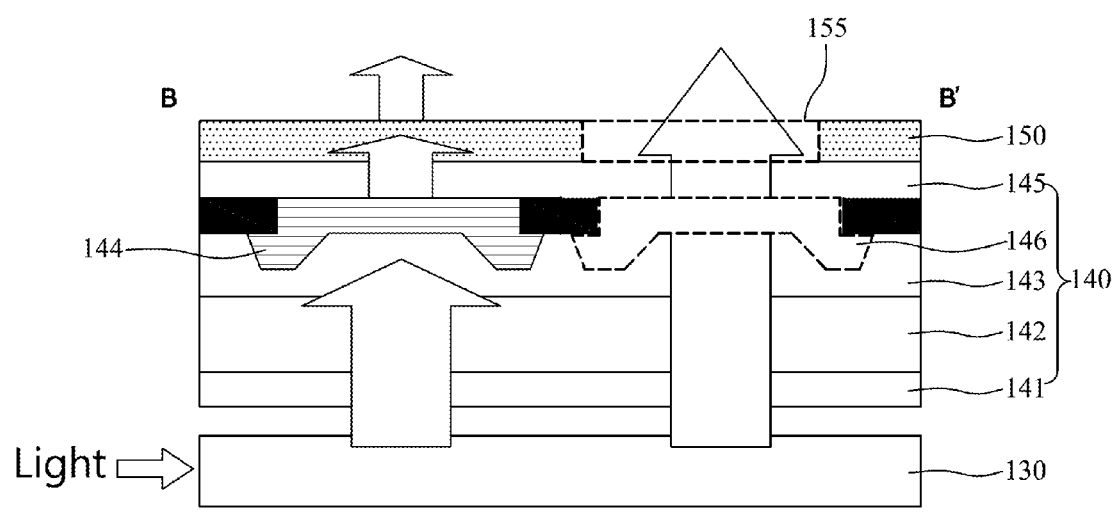
FIG. 5 is a cross section view along B-B' of FIG. 4.

FIG. 4 illustrates a liquid crystal display module according to the first embodiment of the present invention. FIG. 5 is a cross section view along B-B' of FIG. 4. FIGS. 4 and 5 illustrate an edge-type backlight unit which uses an LED as a light source.

Hereinafter, a liquid crystal display module according to the first embodiment of the present invention will be described with reference to FIGS. 4 and 5.

Referring to FIGS. 4 and 5, the liquid crystal display module according to the first embodiment of the present invention includes a liquid crystal panel 140 for displaying images by controlling a light transmittance of liquid crystal according to input video data; a light source (not shown) for supplying light to the liquid crystal panel 140; a light-guiding plate 130 for guiding light incident on its lateral side to a frontal direction of the liquid crystal panel 140; and an upper polarizing plate 150 for polarizing the light outgoing from the liquid crystal panel 140, the upper polarizing plate 150 positioned above the liquid crystal panel 140. Although not shown, there may be a lower polarizing plate (not shown) for polarizing the light emitted from the light source.

The liquid crystal panel 140 includes a lower glass substrate 141, an upper glass substrate 145, spacers (not shown), a liquid crystal layer 142, color filter layers 144 and 146, and an over-coating layer 143. In this case, switching devices such as thin film transistors (TFT) are formed on the lower glass substrate 141; and the color filter layers 144 and 146 are formed on the upper glass substrate 145. Also, the spacers (not shown) are provided between the lower and upper glass substrates 141 and 145, to thereby maintain a cell gap therebetween. The liquid crystal layer 142 is filled in a space prepared by the spacers. Owing to the color filter layers 144 and 146 on the upper glass substrate 145, the light passing through the liquid crystal layer 142 has its own color. The over-coating layer 143 on the liquid crystal layer 142 prevents the color filter layers 144 and 146 from being damaged, and simultaneously enables a planar surface in pixels.

In the liquid crystal panel 140, each pixel region is defined by gate and data lines (not shown) crossing each other at right angles. On the pixel region, a pixel electrode is arranged in parallel to the data line, wherein the pixel electrode is formed of a transparent metal material such as ITO (Indium-Tin-Oxide). Also, the switching device such as the TFT is formed at a crossing portion of the gate and data lines. When the TFT is turned-on by a driving signal applied to the gate line, a data signal applied to the data line is applied to the pixel electrode through a channel layer of the TFT.

The color filter layers 144 and 146 are provided with red (R), green(G), and blue(B) color filter layers 144; and white color filter layers 146. Also, a black matrix is provided between each of the respective color filter layers 144 and 146.

At this time, each of the red(R), green(G), and blue(B) color filter layers 144 is formed through the use of photoresist (PR) having its own peculiar color; and the white color filter 146 is formed of transparent photoresist. For example, the white color filter layer 146 may be formed in a column-spacer forming method using the transparent photoresist, or may be formed in an over-coating method using the transparent photoresist.

In the liquid crystal display module according to the first embodiment of the present invention, the four pixel electrodes, that is, four sub-pixels constitute one unit pixel. On the upper glass substrate 145, the red(R), green(G), and blue(B) color filter layers 144 and the white(W) color filter layers 146 are arranged in a matrix-type configuration, which are provided to confront the pixel electrodes of the lower glass substrate 141. In the liquid crystal panel 140 of the liquid crystal display module according to the first embodiment of the present invention, the four sub-pixels of the red(R), green(G), blue(B), and white(W) sub-pixels constitute one unit pixel.

Accordingly, the color filter layers 144 and 146 of the liquid crystal display module according to the first embodiment of the present invention include the white(W) color filter layers 146 as well as the red(R), green(G), and blue(B) color filter layers 144.

According as the white(W) sub-pixel is additionally provided together with the red(R), green(G), and blue(B) sub-pixels, a light transmittance per unit pixel can be enhanced. Thus, the light with high luminance, outgoing from the liquid crystal panel 140, enables to improve the picture quality.

The upper polarizing plate 150 is provided on the aforementioned liquid crystal panel 140, wherein the upper polarizing plate 150 checks vertically-polarized wave and horizontally-polarized wave of the incident light; and selectively transmits or blocks the vertically-polarized or horizontally-polarized wave. Among the vertical or horizontal light emitted from the backlight unit, the upper polarizing plate 150 transmits only light vibrated in the same direction as a polarizing axis; and absorbs or reflects the other types of light, to thereby generate the polarization in a particular direction.

At this time, the upper polarizing plate 150 includes a polarization area for polarizing the incident light; and a hole 155 for transmitting the light therethrough. The hole 155 is formed in an area corresponding to any one among the sub-pixels of the red(R), green(G), blue(B), and white(W) sub-pixels. FIGS. 4 and 5 illustrate that the hole 155 of the upper polarizing plate 155 is positioned in the area corresponding to the white(W) sub-pixel 146.

In the aforementioned explanation, the hole 155 of the upper polarizing plate 150 is provided in the area corresponding to any one of the red(R), green(G), blue(B), and white(W) sub-pixels included in the unit pixel. However, a modified exemplary case of the present invention may disclose that the plural holes 155 may be respectively provided in the areas corresponding to the plural sub-pixels.

According to another exemplary case of the present invention, the hole 155 may be provided for every unit pixel, or may be provided every predetermined number of the unit pixels. Also, the holes 155 may be respectively formed in the different color filter layers of the neighboring unit pixels.

As mentioned above, the hole 155 of the upper polarizing plate 150 is provided in the area corresponding to at least one of the red(R), green(G), blue(B), and white(W) sub-pixels constituting the unit pixel, and more preferably, the white color filter 146.

The light passing through the white color filter layer 146 is transmitted without being absorbed into or reflected on the upper polarizing plate 150. Thus, the light emitted from the liquid crystal panel 140 is not lost while passing through the upper polarizing plate 150, to thereby improve light efficiency.

Referring to the following table 1, on assumption that the liquid crystal panel has 13.3-inch size, while the light transmittance of the liquid crystal display module according to the related art is 7.86%, the light transmittance of the liquid crystal display module according to the first embodiment of the present invention is 10.74%, whereby the light transmittance of the liquid crystal display module according to the first embodiment of the present invention is increased by 36%, as compared to the light transmittance of the liquid crystal display module according to the related art. On assumption that the liquid crystal panel has 32.0-inch size, while the light transmittance of the liquid crystal display module according to the related art is 5.11%, the light transmittance of the liquid crystal display module according to the first embodiment of the present invention is 8.69%, whereby the light transmittance of the liquid crystal display module according to the first embodiment of the present invention is increased by 70%, as compared to the light transmittance of the liquid crystal display module according to the related art.

TABLE 1

| Size of liquid crystal panel | Light transmittance of the related art | Light transmittance of the present invention | Increase of light transmittance |
| --- | --- | --- | --- |
| 13.3" | 7.86% | 10.74% | Increased by 36% |
| 32.0" | 5.11% | 8.69% | Increased by 70% |

In the liquid crystal display module according to the related art, the light passes through the upper polarizing plate and the color filter layers, whereby the light loss occurs by the respective light transmittances. In the liquid crystal display module according to the first embodiment of the present invention, the unit pixel is provided with the sub-pixels including one white (W) sub-pixel with high light transmittance. Also, the hole 155 of the upper polarizing plate 150 is provided in the area corresponding to the at least one among the four sub-pixels included in the unit pixel. Thus, the light transmittance of the present invention can be considerably improved in comparison to the light transmittance of the related art.

Figure 6:
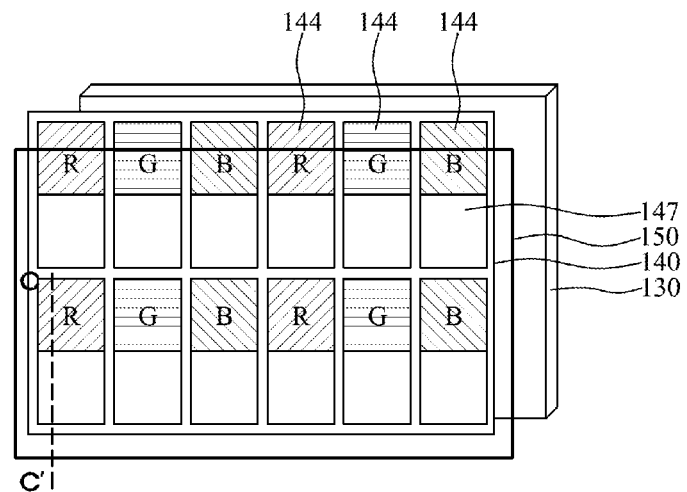
FIG. 6 illustrates a liquid crystal display module according to the second embodiment of the present invention.
Figure 7:
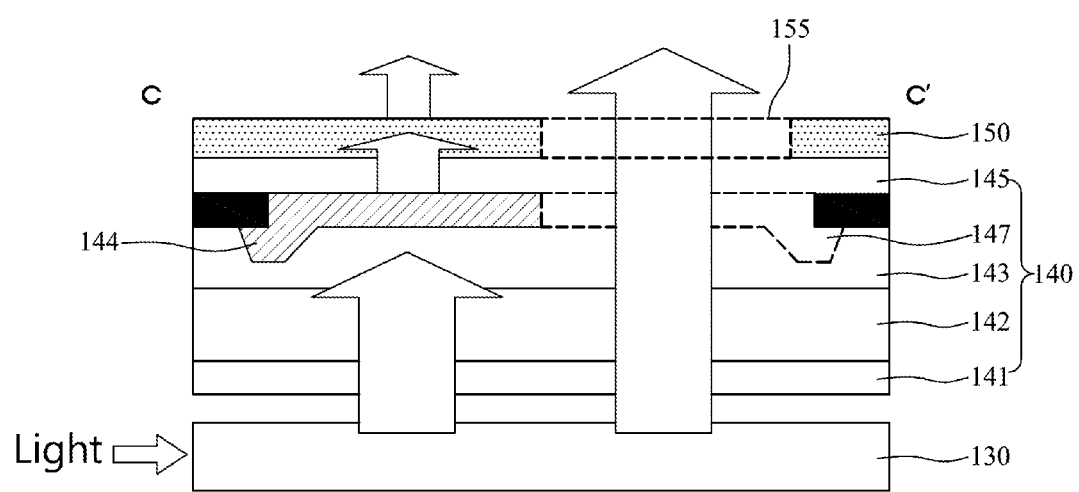
FIG. 7 is a cross section view along C-C' of FIG. 6.

FIG. 6 illustrates a liquid crystal display module according to the second embodiment of the present invention. FIG. 7 is a cross section view along C-C' of FIG. 6. FIGS. 6 and 7 illustrate an edge-type backlight unit which uses an LED as a light source.

Hereinafter, a liquid crystal display module according to the second embodiment of the present invention will be described with reference to FIGS. 6 and 7. Except a color filter layer 144 and upper polarizing plate 150 of a liquid crystal panel 140, the liquid crystal display module according to the second embodiment of the present invention is identical in structure to the liquid crystal display module according to the first embodiment of the present invention, whereby a detail explanation for the same parts will be omitted.

Referring to FIGS. 6 and 7, the liquid crystal display module according to the second embodiment of the present invention includes a liquid crystal panel 140 for displaying images by controlling a light transmittance of liquid crystal according to input video data; a light source (not shown) for supplying light to the liquid crystal panel 140; a light-guiding plate 130 for guiding light incident on its lateral side to a frontal direction of the liquid crystal panel 140; and an upper polarizing plate 150 for polarizing the light emitted from the liquid crystal panel 140, the upper polarizing plate 150 positioned above the liquid crystal panel 140. Although not shown, there may be a lower polarizing plate (not shown) for polarizing the light emitted from the light source.

The liquid crystal panel 140 includes a lower glass substrate 141, an upper glass substrate 145, spacers (not shown), a liquid crystal layer 142, an over-coating layer 143, and color filter layers 144. In this case, switching devices such as thin film transistors (TFT) are formed on the lower glass substrate 141; and the color filter layers 144 are formed on the upper substrate 145. Also, the spacers (not shown) are provided between the lower and upper glass substrates 141 and 145, to thereby maintain a cell gap therebetween. The liquid crystal layer 142 is filled in a space prepared by the spacers. The over-coating layer 143 prevents the color filter layers 144 from being damaged, and simultaneously enables a planar surface in pixels. Owing to the color filter layers 144 on the upper glass substrate 145, the light passing through the liquid crystal layer 142 has its own peculiar color.

The color filter layers 144 include red (R), green(G), and blue(B) color filter layers 144, wherein a black matrix is provided between each of the respective color filter layers 144. Each of the red(R), green(G), and blue(B) color filter layers 144 has a hole 147 to transmit the light therethrough.

At this time, each of the red(R), green(G), and blue(B) color filter layers 144 is formed through the use of photoresist (PR) having its own peculiar color. Also, the hole 147 may be formed by partially removing the photoresist (PR) for the process of forming the color filter layers 144.

In the liquid crystal display module according to the second embodiment of the present invention, the three sub-pixels constitute each unit pixel. On the upper glass substrate 145, the red(R), green(G), and blue(B) color filter layers 144 are arranged in a matrix-type configuration, which are provided to confront the pixel electrodes of the lower glass substrate 141. In the liquid crystal panel 140 of the liquid crystal display module according to the second embodiment of the present invention, the three sub-pixels of the red(R), green (G), and blue(B) constitute one unit pixel, wherein each of the red(R), green(G), and blue(B) sub-pixels includes the hole 147 to transmit the light therethrough.

Accordingly, each of the red(R), green(G), and blue(B) sub-pixels 144 in the liquid crystal display module according to the second embodiment of the present invention includes the hole 147 to transmit the light therethrough, to thereby improve the light transmittance per unit pixel. Thus, the picture quality can be highly improved owing to the high-luminance light outgoing from the liquid crystal panel 140.

In the aforementioned explanation, the unit pixel comprises the three sub-pixels including the red(R), green(G), and blue(B) sub-pixels. Another example may disclose that the unit pixel may comprise the four sub-pixels including an additional white(W) sub-pixel in addition to the red(R), green (G), and blue(B) sub-pixels.

The upper polarizing plate 150 is provided on the aforementioned liquid crystal panel 140, wherein the upper polarizing plate 150 checks vertically-polarized wave and horizontally-polarized wave of the incident light; and selectively transmits or blocks the vertically-polarized or horizontally-polarized wave. Among the vertical or horizontal light emitted from the backlight unit, the upper polarizing plate 150 transmits only light vibrated in the same direction as a polarizing axis; and absorbs or reflects the other types of light, to thereby generate the polarization in a particular direction.

At this time, the upper polarizing plate 150 includes a hole 155 to transmit the light therethrough. The hole 155 is formed in an area corresponding to any hole 147 formed in the sub-pixels of the red(R), green(G), and blue(B) sub-pixels. In this case, the hole 155 of the upper polarizing plate 150 may be provided for every unit pixel, or may be provided every predetermined number of the unit pixels.

As mentioned above, the hole 147 is formed in each of the red(R), green(G), and blue(B) sub-pixels constituting the unit pixel; and the hole 155 of the upper polarizing plate 150 is provided in the area corresponding to the hole 147 in the color filter layer 144 of the sub-pixel.

Thus, the light transmitted through the hole 147 of the sub-pixel is intactly transmitted through the hole 155 of the upper polarizing plate 150 without being absorbed into or reflected on the upper polarizing plate 150. As a result, it is possible to prevent the light loss, which might occurs when the light emitted from the liquid crystal panel 140 passes through the color filter layers 144 and the upper polarizing plate 150, to thereby result in improved light efficiency.

In case of the liquid crystal display module according to the related art, when the light passes through the upper polarizing plate and the color filter layer, the light loss inevitably occurs. However, the liquid crystal display module according to the second embodiment of the present invention includes the hole 147 in the color filter layer 144 of the sub-pixel, and the hole 155 in the upper polarizing plate 150, wherein the hole 155 in the upper polarizing plate 150 is positioned in the area corresponding to the hole 147 in the color filter layer 144 of the sub-pixel, to thereby improve the light transmittance, as shown in the above table 1.

In the related art, the light source has to be additionally provided to improve the luminance of light outgoing from the liquid crystal panel, whereby the manufacturing cost is increased. However, in case of the liquid crystal display modules according to the embodiments of the present invention, the luminance of light outgoing from the liquid crystal panel can be improved without the additional light source, so that it is possible to reduce the manufacturing cost.

Also, the liquid crystal display module according to the embodiment of the present invention can prevent the increase of power consumption, which might occur when the additional light source is provided to obtain the high luminance.

In the liquid crystal display module according to the embodiment of the present invention, the hole for transmitting the light is formed in the color filter layer, so that it is possible to improve the transparency of the liquid crystal display module, and the luminance of the liquid crystal panel.

Also, the hole for transmitting the light is formed in the upper polarizing plate of the liquid crystal panel, to thereby improve the transparency of the liquid crystal display module, and the luminance of the liquid crystal panel.

In addition, the liquid crystal display module according to the present invention enables the decreased manufacturing cost, and the decreased power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display module comprising:
   a liquid crystal panel with plural unit pixels, wherein each unit pixel includes red (R), green (G), blue (B), and white (W) sub-pixels, for converting incident light into colored light;
   a light source for supplying light to the liquid crystal panel;
   a light-guiding plate for changing a horizontal direction of incident light from the light source into a vertical direction; and a polarizing plate including a polarization area for polarizing the light outgoing from the red, green and blue sub-pixels, and a hole for transmitting the light passing the white sub-pixel.

2. The liquid crystal display module according to claim 1, wherein the hole of the polarizing plate is provided every unit pixel.

3. The liquid crystal display module according to claim 1, wherein the hole of the polarizing plate is provided every predetermined number of the unit pixels.

4. The liquid crystal display module according to claim 1, wherein a color filter layer of the white (W) sub-pixel is formed of transparent photoresist.

5. A liquid crystal display module comprising:
a liquid crystal panel with plural unit pixels, wherein each unit pixel includes red (R), green (G), and blue (B) color filter layers, for converting incident light into colored light wherein each of the red, green, and blue color filter layers includes a hole to transmit the light;
a light source for supplying light to the liquid crystal panel;
a light-guiding plate for changing a horizontal direction of incident light from the light source into a vertical direction; and
a polarizing plate including a polarization area for polarizing the light outgoing from the red, green and blue color filter layers, and a hole for transmitting the light to the hole of the red, green, and blue color filter layers.

6. The liquid crystal display module according to claim 5, wherein the hole of the polarizing plate is positioned in an area corresponding to the hole of the color filter layer.

7. The liquid crystal display module according to claim 5, wherein the hole of the polarizing plate is provided every unit pixel.

8. The liquid crystal display module according to claim 5, wherein the hole of the polarizing plate is provided every predetermined number of the unit pixels.

* * * * *